(12) United States Patent  (10) Patent No.:     US 8,676,952 B2
Reynolds et al.                  (45) Date of Patent:      Mar. 18, 2014

(54) USER ADAPTIVE HTTP STREAM MANAGER AND METHOD FOR USING SAME

(75) Inventors: Jennifer Reynolds, Duluth, GA (US); Charles Dasher, Lawrenceville, GA (US)

(73) Assignee: Ericsson Television Inc., Duluth, GA (US)

( * ) Notice: Subject to any disclaimer, the term of this patent is extended or adjusted under 35 U.S.C. 154(b) by 232 days.

(21) Appl. No.: 13/230,995

(22) Filed: Sep. 13, 2011

(65) Prior Publication Data

US 2013/0067052 A1    Mar. 14, 2013

(51) Int. Cl.
    *G06F 15/173*    (2006.01)

(52) U.S. Cl.
    USPC ........................................ 709/223

(58) Field of Classification Search
    USPC .................. 709/202, 203, 217, 220, 223, 231
    See application file for complete search history.

(56) References Cited

U.S. PATENT DOCUMENTS

| | | | |
|---|---|---|---|
| 7,769,880 B2 * | 8/2010 | Paka et al. ...................... | 709/231 |
| 7,865,599 B2 * | 1/2011 | Zhu et al. ....................... | 709/226 |
| 8,171,153 B2 * | 5/2012 | Shukla et al. ................... | 709/231 |
| 2002/0053078 A1 | 5/2002 | Holtz et al. | |
| 2004/0019900 A1 * | 1/2004 | Knightbridge et al. ......... | 725/23 |
| 2005/0002402 A1 * | 1/2005 | Fairman ..................... | 370/395.5 |
| 2005/0108746 A1 * | 5/2005 | Futagami et al. ............... | 725/31 |
| 2005/0193425 A1 | 9/2005 | Sull et al. | |
| 2005/0254526 A1 * | 11/2005 | Wang et al. ................... | 370/503 |
| 2006/0161635 A1 * | 7/2006 | Lamkin et al. ................ | 709/217 |
| 2007/0106814 A1 * | 5/2007 | Son et al. ...................... | 709/232 |
| 2007/0171903 A1 * | 7/2007 | Zeng et al. .................... | 370/389 |
| 2010/0158099 A1 | 6/2010 | Kalva et al. | |
| 2010/0161825 A1 * | 6/2010 | Ronca et al. .................. | 709/231 |
| 2011/0125918 A1 | 5/2011 | Ha | |
| 2011/0246616 A1 * | 10/2011 | Ronca et al. .................. | 709/219 |
| 2011/0246661 A1 * | 10/2011 | Manzari et al. ............... | 709/231 |
| 2012/0197419 A1 * | 8/2012 | Dhruv et al. ................... | 700/94 |
| 2012/0198492 A1 * | 8/2012 | Dhruv et al. ................... | 725/32 |
| 2012/0203923 A1 * | 8/2012 | Shukla et al. ................. | 709/231 |
| 2012/0246191 A1 * | 9/2012 | Xiong .......................... | 707/769 |
| 2012/0254456 A1 * | 10/2012 | Visharam et al. ............. | 709/231 |
| 2012/0263434 A1 * | 10/2012 | Wainner et al. ............... | 386/241 |
| 2012/0331293 A1 * | 12/2012 | Ma et al. ....................... | 713/168 |
| 2013/0054745 A1 * | 2/2013 | Ando et al. ................... | 709/217 |
| 2013/0067109 A1 * | 3/2013 | Dong et al. ................... | 709/231 |
| 2013/0097309 A1 * | 4/2013 | Ma et al. ....................... | 709/224 |
| 2013/0275615 A1 * | 10/2013 | Oyman ......................... | 709/231 |

* cited by examiner

*Primary Examiner* — Sargon Nano

(57) ABSTRACT

A stream manager and a method are described herein for creating an adaptive stream manifest file (e.g., HTTP adaptive stream manifest file) associated with original content where the original content is subsequently modified while being streamed based on input from a user of a user device. The user device is configured to request, receive and playback the original content and the modified content associated with the adaptive stream manifest file.

20 Claims, 10 Drawing Sheets

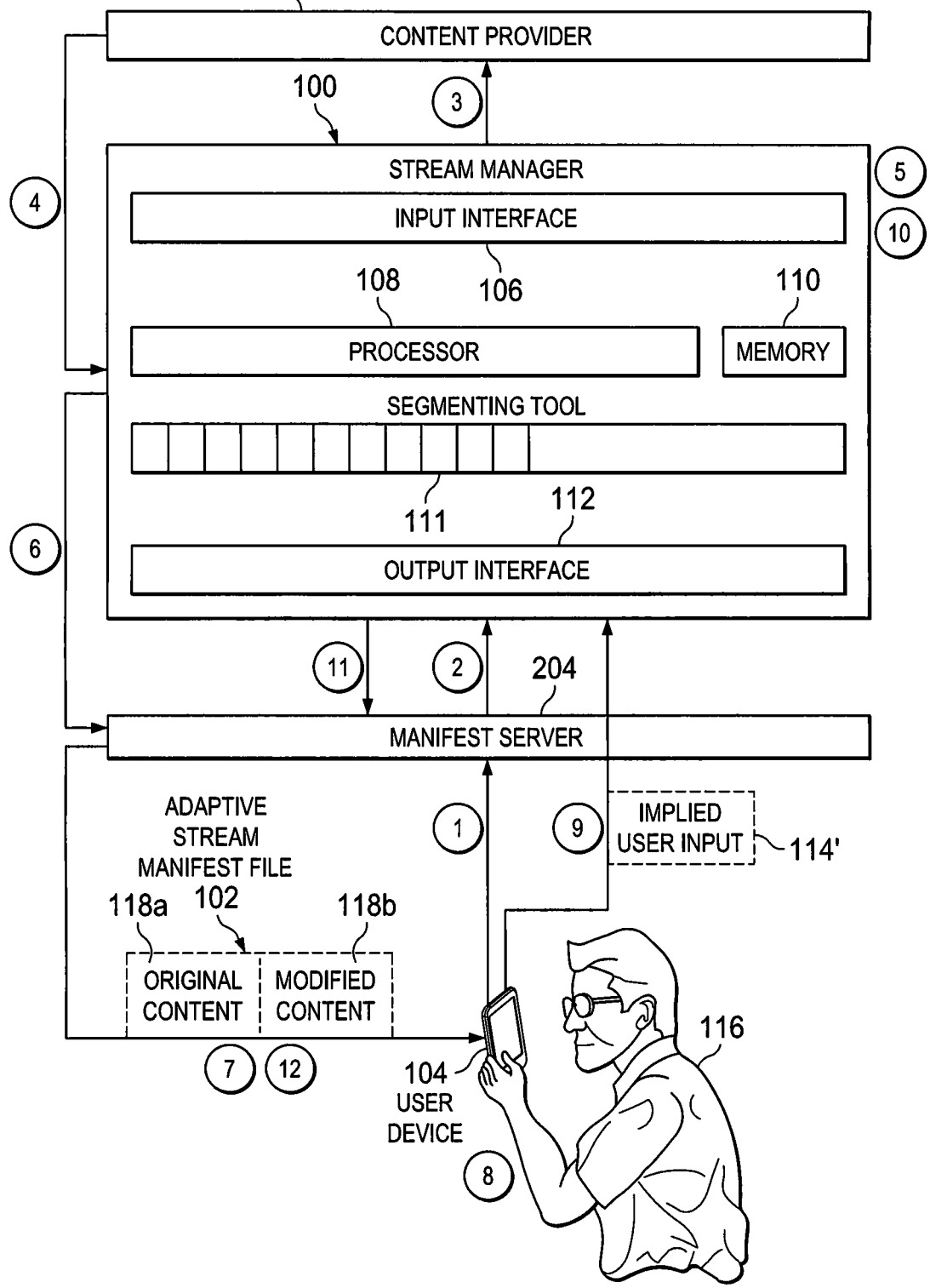

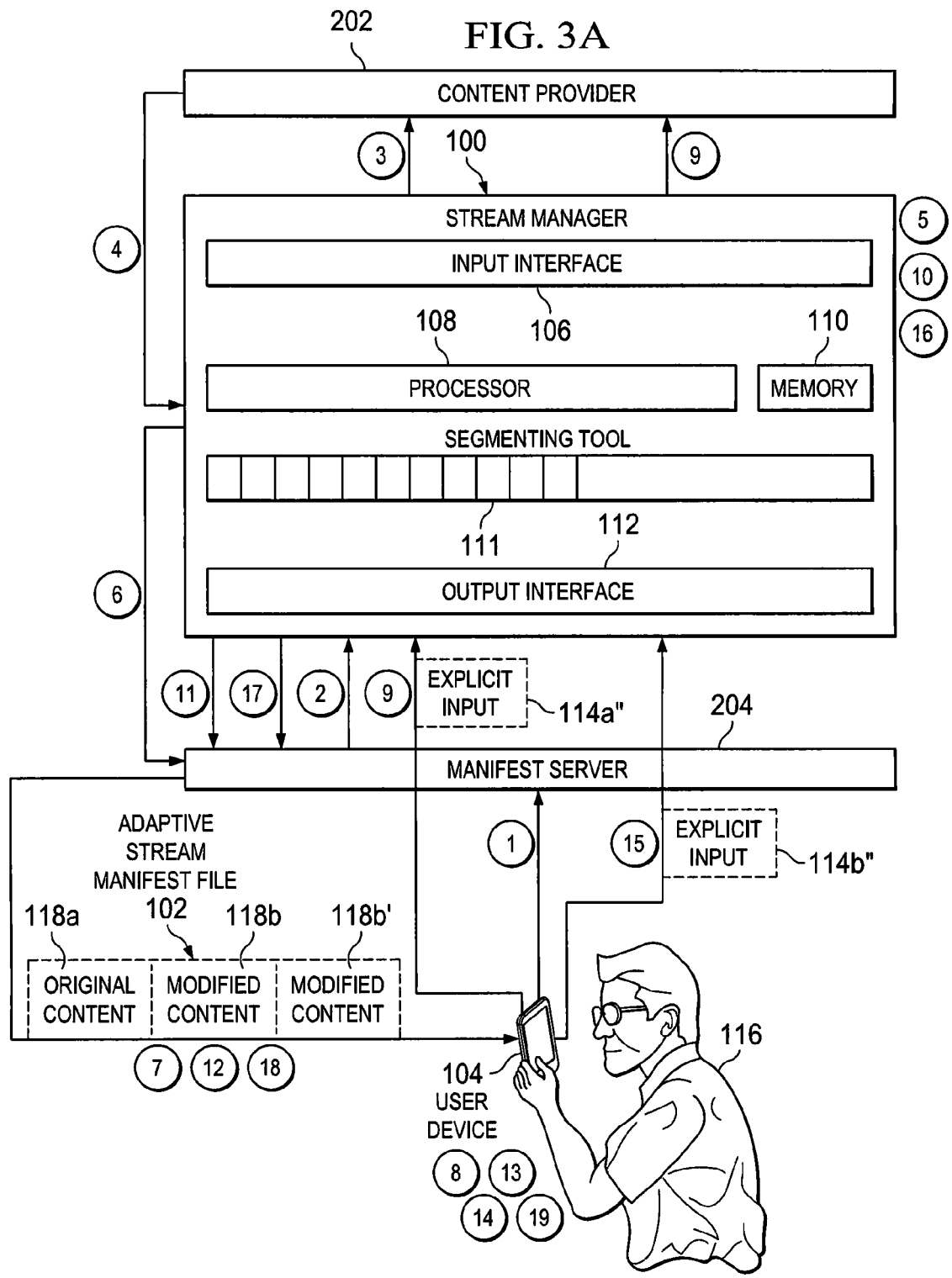

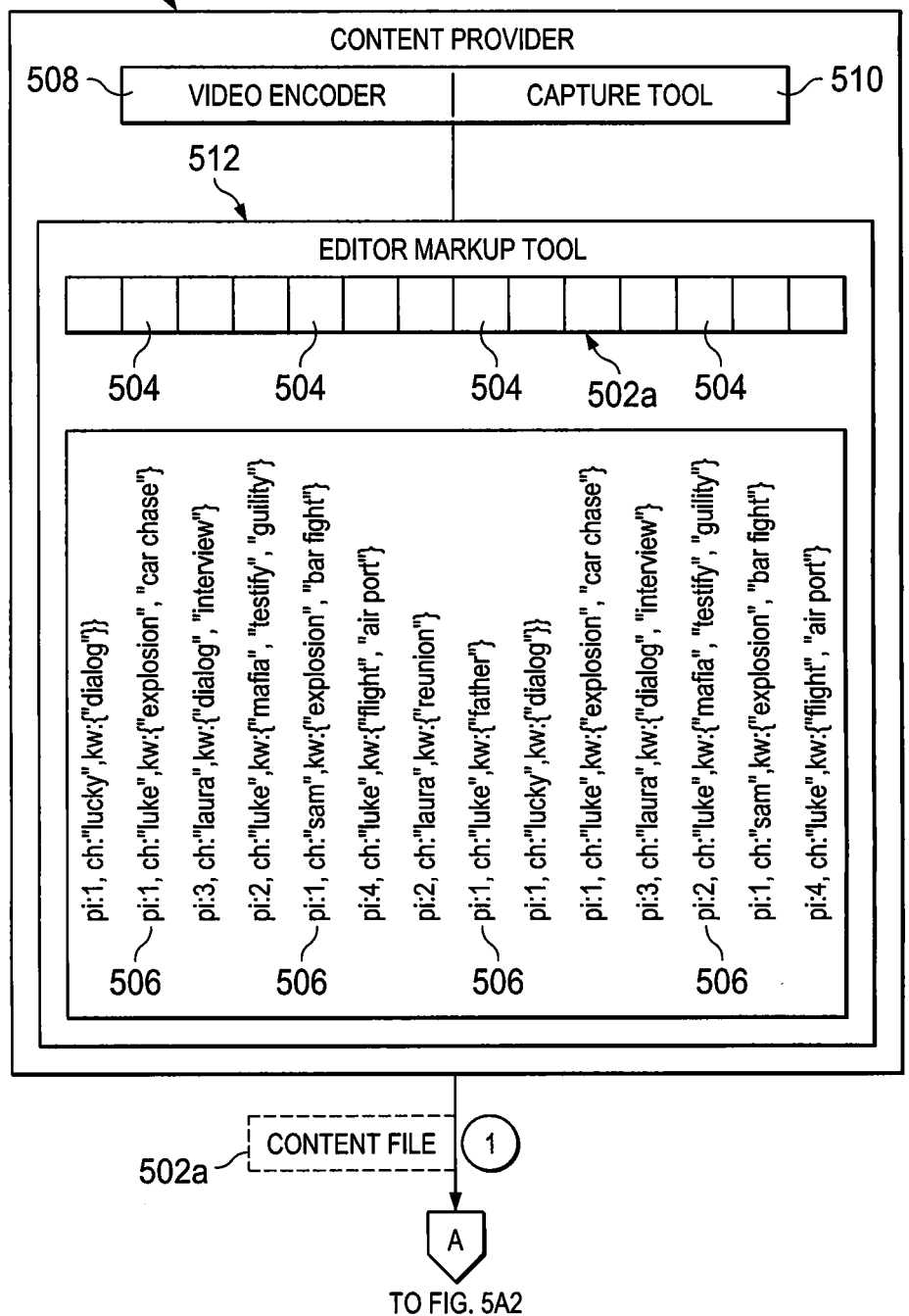

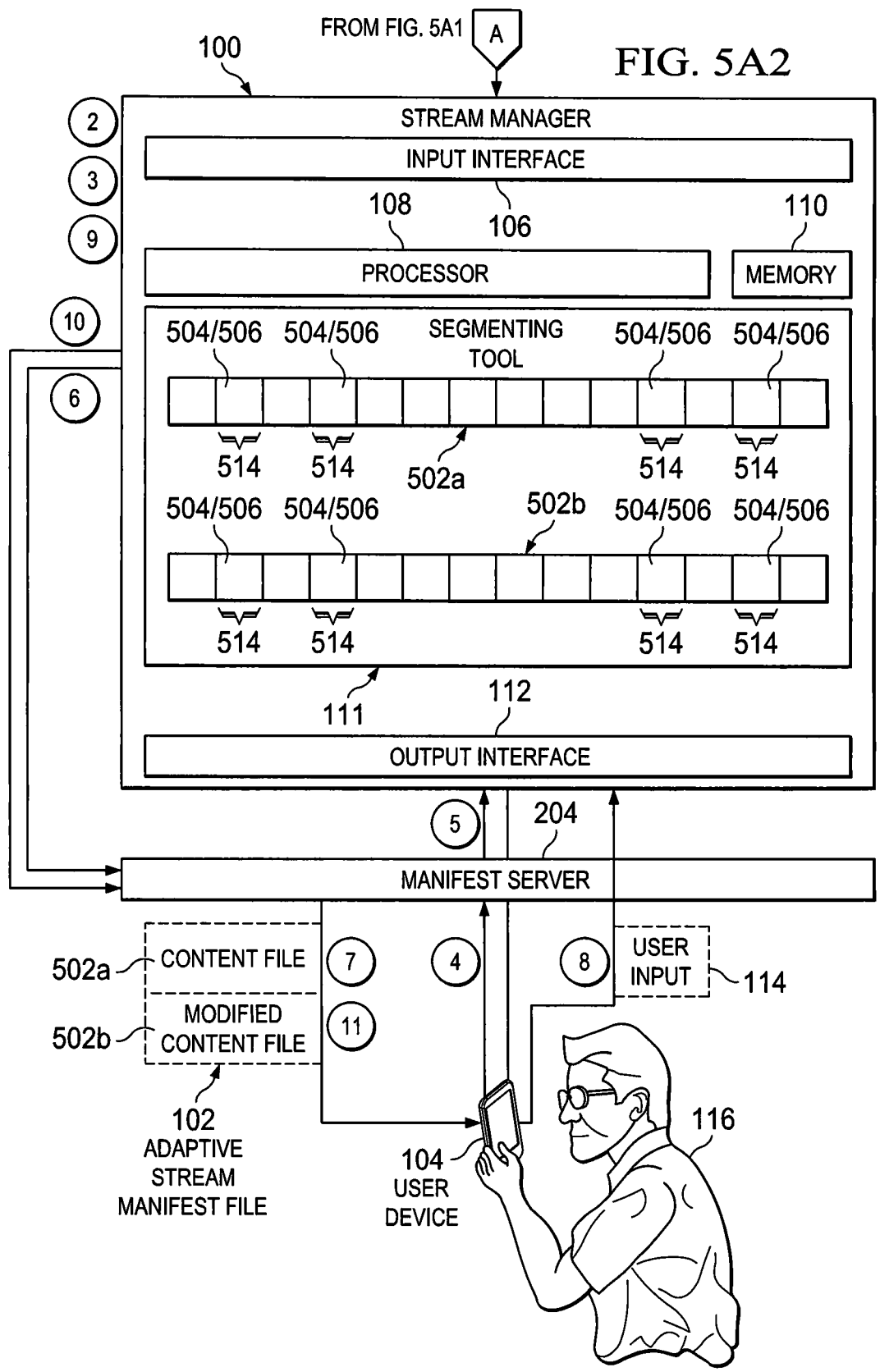
FIG. 5A2

USER ADAPTIVE HTTP STREAM MANAGER AND METHOD FOR USING SAME

TECHNICAL FIELD

The present invention relates to a stream manager and a method for creating an adaptive stream manifest file (e.g., HTTP adaptive stream manifest file) associated with original content which is subsequently modified while being streamed based on input from a user of a user device. The user device is configured to request, receive, and then playback the original content and the modified content associated with the adaptive stream manifest file.

BACKGROUND

The following abbreviations are herewith defined, at least some of which are referred to within the following description about at least the prior art and/or the present invention.

| | |
|---|---|
| HLS | HTTP Live Streaming |
| HTTP | Hypertext Transfer Protocol |
| MPEG | Moving Picture Experts Group |
| RTP | Real Time Transport Protocol |
| RTSP | Real Time Streaming Protocol |

Adaptive bitrate streaming is a technique used by a stream manager (e.g., adaptive streaming server) for streaming multimedia over networks to user devices (e.g., computers, mobile communication devices, tablets, smart phones). While in the past most video streaming technologies utilized streaming protocols such RTP with RTSP, today's adaptive streaming technologies are mostly based on HTTP and are designed to work efficiently over large distributed HTTP networks such as the Internet.

HTTP adaptive bit rate streaming requires that the stream manager have multiple files of the source video which are encode at different bit rates. The stream manager then switches between streaming the different encodings of the content file depending on requests received from the user's device. The result of the HTTP stream is that the user's device experiences very little buffering and a fast start time so the user has a good experience for both high-end and low-end network connections.

Today, there are several HTTP adaptive bit rate streaming technologies that can be used by an adaptive streaming server for streaming multimedia over networks such as the Internet to user devices. For example, Apple's HTTP Live Stream (HLS) m3u8 file system is one such HTTP adaptive bit rate streaming technology where a "manifest" file is created to reference many video segments which are updated in real time to play in a particular order. Other HTTP adaptive bit rate streaming technologies include Adobe's Dynamic stream for Flash, Microsoft's Smooth Streaming etc. . . .

Although the current streaming technologies work fine there is still a desire to enhance streaming technologies and improve the streaming of content to user devices. This need and other needs are satisfied by the present invention.

SUMMARY

A stream manager and a method for enhancing streaming technologies are described in the independent claims of the present application. Advantageous embodiments of the stream manager and the method have been described in the dependent claims of the present application.

In one aspect, the present invention provides a stream manager configured to create an adaptive stream manifest file which is provided to a user device. The stream manager comprises a processor and a memory that stores processor-executable instructions therein where the processor interfaces with the memory and executes the processor-executable instructions to create the adaptive stream manifest file associated with original content where the original content is subsequently modified while being streamed to the user device based on input from a user of the user device. The user device is configured to request, receive and playback the original content and the modified content associated with the adaptive stream manifest file. The stream manager has an advantage in that it can create and update an adaptive streaming manifest file (in HLS or other formats using segmenting) on the fly based on user input without requiring the user to change the file that their user device is playing.

In yet another aspect, the present invention provides a method implemented by a stream manager for creating an adaptive stream manifest file which is streamed to a user device. The method comprises the step of creating the adaptive stream manifest file associated with original content where the original content is subsequently modified while being streamed to the user device based on input from a user of the user device. The user device is configured to request, receive and playback the original content and the modified content associated with the adaptive stream manifest file. The method has an advantage in that it can create and update an adaptive streaming manifest file (in HLS or other formats using segmenting) on the fly based on user input without requiring the user to change the file that their user device is playing.

In still yet another aspect, the present invention provides a stream manager configured to create an adaptive stream manifest file which is provided to a user device. The stream manager comprises a processor and a memory that stores processor-executable instructions therein where the processor interfaces with the memory and executes the processor-executable instructions to enable the following: (a) receiving a request initiated by the user via the user device to stream a desired piece of content; (b) creating segments for the adaptive stream manifest file corresponding to the desired piece of content; (c) causing the adaptive stream manifest file with references to the segments to be streamed to the user device which is configured to request, receive and playback the desired piece of content; (d) receiving an input initiated by the user of the user device indicating that the desired piece of content should be modified; (e) creating additional segments for the adaptive stream manifest file corresponding to the modified piece of content; and (f) causing the adaptive stream manifest file with references to the additional segments to be streamed to the user device which is configured to request, receive and playback the modified piece of content. The stream manager has an advantage in that it can create and update an adaptive streaming manifest file (in HLS or other formats using segmenting) on the fly based on user input without requiring the user to change the file that their user device is playing.

In still yet another aspect, the present invention provides a stream manager configured to create an adaptive stream manifest file which is provided to a user device. The stream manager comprises a processor and a memory that stores processor-executable instructions therein where the processor interfaces with the memory and executes the processor-executable instructions to enable the following: (a) receiving a content file with one or more descriptive labels associated with one or more scenes of the content file; (b) segmenting the content file while taking into account the one or more descriptive labels associated with the one or more scenes of the content file; (c) storing each segment and associated one or more descriptive labels of the content file; (d) receiving a request initiated by the user via the user device to stream the content file; (e) adding references associated with the segments to the adaptive stream manifest file; (f) causing the adaptive stream manifest file containing the references to the segments associated with the content file to be streamed to the user device which is configured to receive and playback the content file; (g) receiving an input initiated by the user of the user device indicating that the content file should be modified based on at least one of the one or more descriptive labels; (h) modifying the content file to include only the segments per the input from the user; and (i) causing the adaptive stream manifest file with references to the segments associated with the modified content file to be streamed to the user device which is configured to request, receive and playback the modified content file. The stream manager has an advantage in that it can create and update an adaptive streaming manifest file (in HLS or other formats using segmenting) on the fly based on user input without requiring the user to change the file that their user device is playing.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 2A-2B are two diagrams used to explain one way how the stream manager shown in FIG. 1 can create an adaptive stream manifest file associated with original content which is subsequently modified while being streamed to the user device based on implied input (less direct input) from a user of the user device which playbacks the original content and modified content in accordance with an embodiment of the present invention;

FIGS. 3A-3B are two diagrams used to explain another way how the stream manager shown in FIG. 1 can create an adaptive stream manifest file associated with original content which is subsequently modified while being streamed to the user device based on explicit input from a user of the user device which playbacks the original content and modified content in accordance with an embodiment of the present invention;

FIGS. 5A1, 5A2 and 5B are several diagrams used to explain still yet another way how the stream manager shown in FIG. 1 can create an adaptive stream manifest file associated with original content which is subsequently modified while being streamed to the user device based on input from a user of the user device which playbacks the original content and modified content in accordance with an embodiment of the present invention.

DETAILED DESCRIPTION

Figure 1:
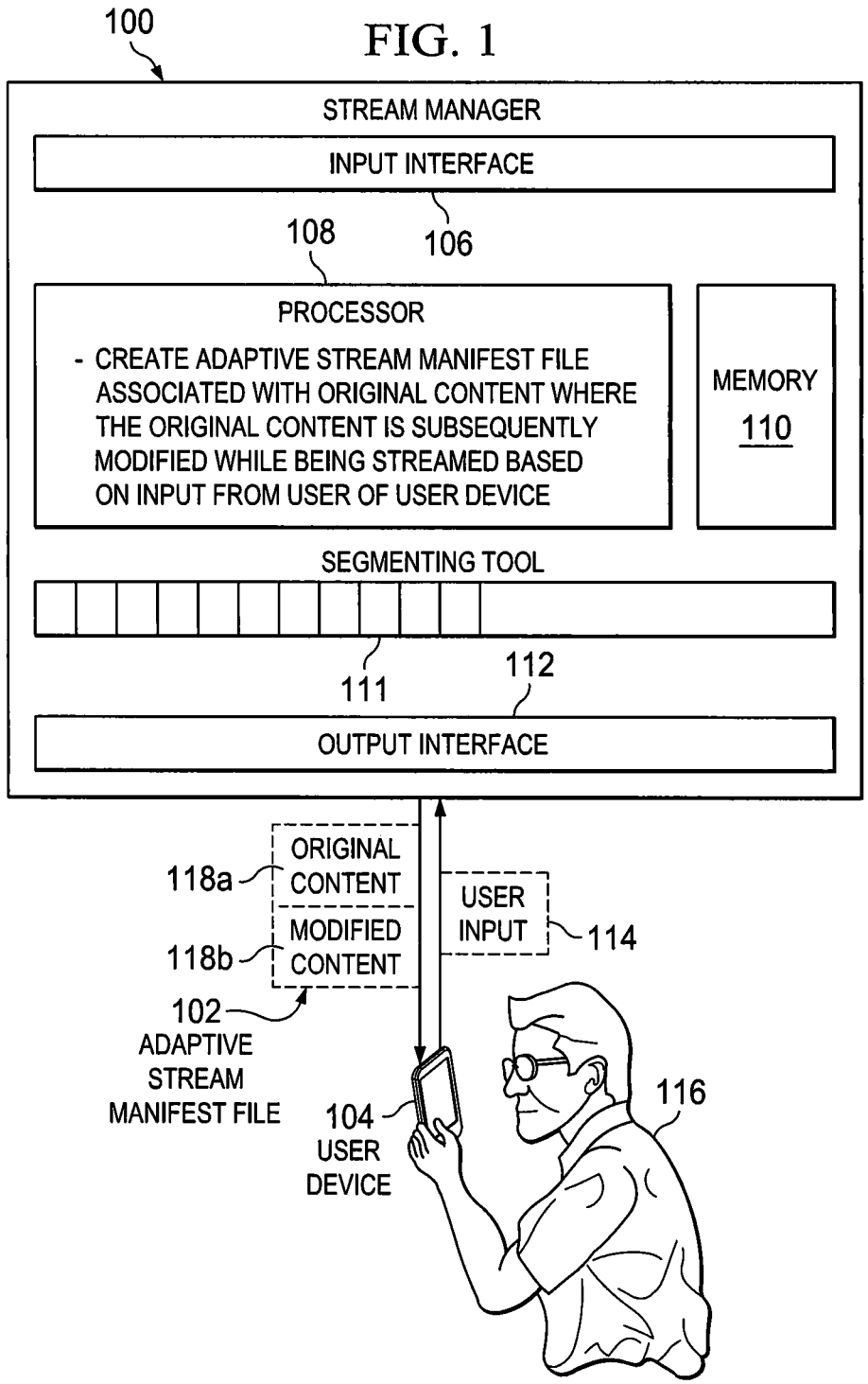
FIG. 1 is a diagram of an exemplary stream manager configured in accordance with an embodiment of the present invention.

Referring to FIG. 1, there is a diagram of an exemplary stream manager 100 configured to create an adaptive stream manifest file 102 which is provided to a user device 104 in accordance with an embodiment of the present invention. As shown, the stream manager 100 includes an input interface 106, a processor 108, a memory 110, a segmenting tool 111, and an output interface 112. The stream manager 100 may include many other components which are well known in the art but for clarity those well known components are not described herein. The stream manager 100 functions by having the processor 108 interface with the memory 110 and execute processor-executable instructions stored thereon to create the adaptive stream manifest file 102 associated with original content 118a which is subsequently modified while being streamed to the user device 104 based on input 114 from a user 116 of the user device 104 (see step 120). The user device 104 (e.g., computer 104, mobile communication device 104, tablet 104, smart phone 104, HTTP enabled device 104) is configured to receive and playback the original content 118a and the modified content 118b associated with the adaptive stream manifest file 102. Several different examples about how the stream manager 100 can create the adaptive stream manifest file 102 in accordance with different embodiments of the present invention are discussed in detail below with respect to FIGS. 2-5.

Figure 2B:
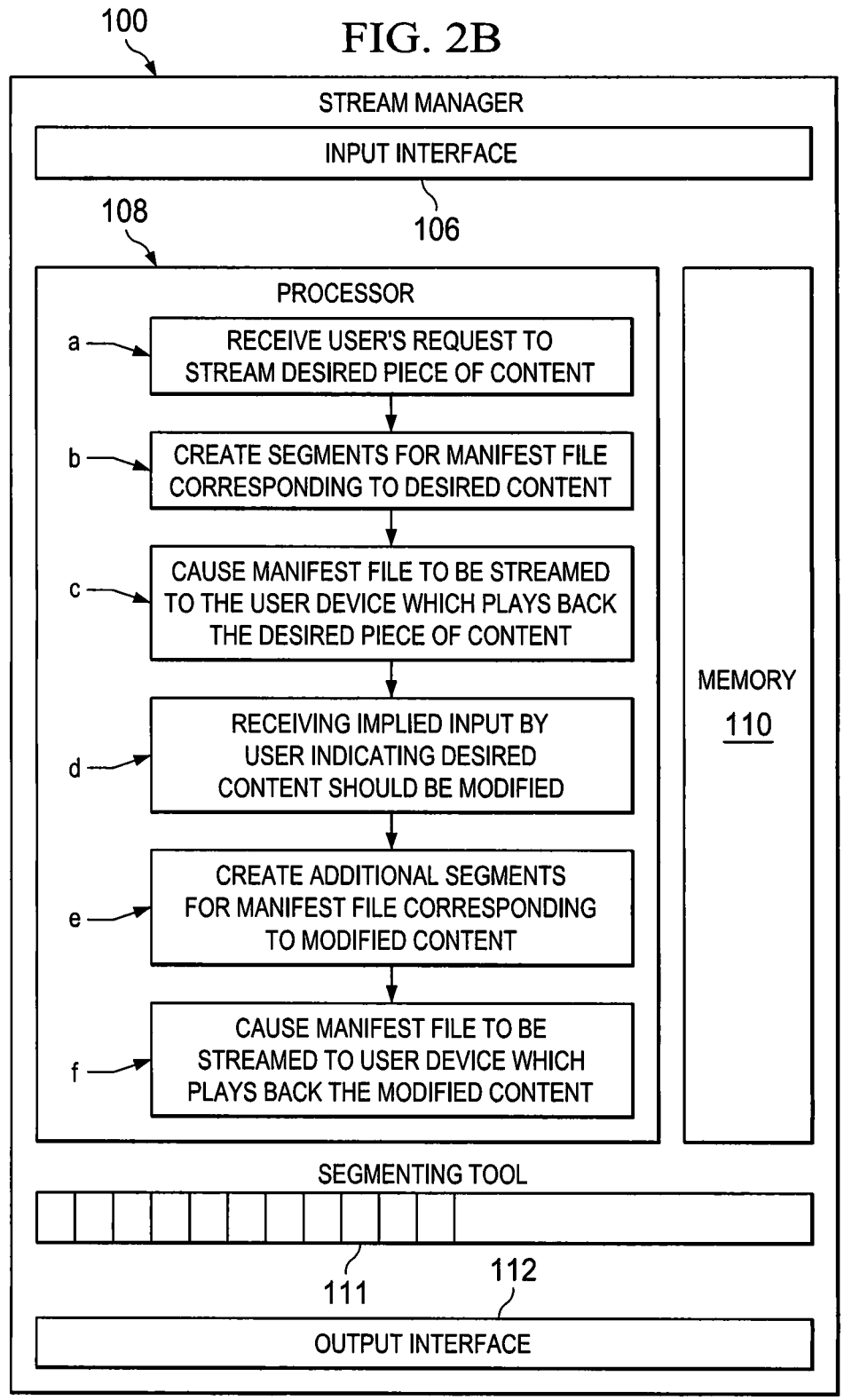

Referring to FIGS. 2A-2B, there are two diagrams used to explain one way how the stream manager 100 can create the adaptive stream manifest file 102 associated with original content 118a which is subsequently modified while being streamed to the user device 104 based on implied input 114' (less direct input 114') from a user 116 of the user device 104 in accordance with an embodiment of the present invention. In FIG. 2A, there is a diagram illustrating the exemplary signaling that can take place between the stream manager 100, the user device 104, a content provider 202, and a manifest server 204 such that the stream manager 100 can create and modify the adaptive stream manifest file 102 based on implied input 114' (less direct input 114') from the user 116. The exemplary signaling that can take place between the components 100, 104, 202 and 204 are as follows:

1. The user device 104 signals the manifest server 204 that a piece of content 118a is desired.

2. The manifest server 204 asks the stream manager 100 where to get content 118a. The stream manager 100 notes that the user 116 of the user device 104 has a free or otherwise standard account.

3. The stream manager 100 contacts the content provider 202 and requests the content 118a.

4. The stream manager 100 receives the content 118a from the content provider 202.

5. The stream manager 100 uses the segmenting tool 111 to create segments for an adaptive stream manifest file 102 that has advertising throughout the selected content 118a. For instance, the advertising can be selected based on specific attributes (e.g., demographics) of the user 116.

6. The stream manager 100 begins sending references to the segments to the manifest server 204 to be written to the adaptive stream manifest file 102.

7. The manifest server 204 returns the adaptive stream manifest file 102 to the user device 104 to enable playback of original content 118*a*.

8. The user 116 views the original content 118*a* referencing the single adaptive stream manifest file 102.

9. The user 116 while viewing the original content 118*a* has had enough advertisements and purchases the content outright, or upgrades to a paid subscription to be able to view content 118*b* which does not have the advertising. This implied input 114' reflecting the changed status of the user 116 is received by the stream manager 100.

10. The stream manager 100 notes the changed user status, and begins to write segments which contain only the content 118*b* (not the advertising) for the same adaptive stream manifest file 102 that is currently being streamed to the user device 104.

11. The stream manager 100 begins sending references to the new segments to the manifest server 204 to be written to the adaptive stream manifest file 102.

12. The manifest server 204 returns the adaptive stream manifest file 102 to the user device 104 to enable playback of the modified content 118*b* now with no advertisements and requiring no refreshing of the page/screen or other disruptive behaviors.

The aforementioned example where the stream manager 100 causes original content 118*a* with advertisements located therein to be streamed to the user 116 and then pursuant to the user's implied input 114' (e.g., change in account status) the stream manager 100 adapts the adaptive stream manifest file 102 to contain references to segments associated with the modified content 118*b* which no longer has advertising located therein is just one exemplary scenario of the present invention. The skilled person having the foregoing teaching will readily appreciate that the stream manager 100 can create the adaptive stream manifest file 102 which is subsequently adapted while the user device 104 is playing back contents 118*a* and 118*b* based on many different types of implied input 114' such as, for example, the user's demographics or the user's viewing habits. In any case, a general discussion is provided next with respect to FIG. 2B about how the stream manager 100 can create the adaptive stream manifest file 102 associated with original content 118*a* which is modified while being streamed to the user device 104 based on implied input 114' (less direct input 114') from the user 116 of the user device 104.

As shown in FIG. 2B, the stream manager 100 is configured to create the adaptive stream manifest file 102 associated with original content 118*a* which is modified while being streamed to the user device 104 based on implied input 114' (less direct input 114') from the user 116 of the user device 104 in accordance with an embodiment of the present invention. The stream manager 100 includes the input interface 106, the processor 108, the memory 110, the segmenting tool 111 and the output interface 112. The stream manager 100 functions by having the processor 108 interface with the memory 110 and execute processor-executable instructions stored therein to enable the creating of the adaptive stream manifest file 102 by: (a) receiving a request initiated by the user 116 via the user device 104 to stream a desired piece of content 118*a* (step a); (b) creating segments for the adaptive stream manifest file 102 corresponding to the desired piece of content 118*a* (step b); (c) causing the adaptive stream manifest file 102 with references to the segments to be streamed to the user device 104 which is configured to request, receive and playback the desired piece of content 118*a* (step c); (d) receiving implied input 114' (less direct input 114') initiated by the user 116 of the user device 104 indicating that the desired piece of content 118*a* should be modified (step d); (e) creating additional segments for the adaptive stream manifest file 102 corresponding to the modified piece of content 118*b* (step e); and (f) causing the adaptive stream manifest file 102 with references to the additional segments to be streamed to the user device 104 which is configured to request, receive and playback the modified piece of content 118*b*.

Figure 3B:
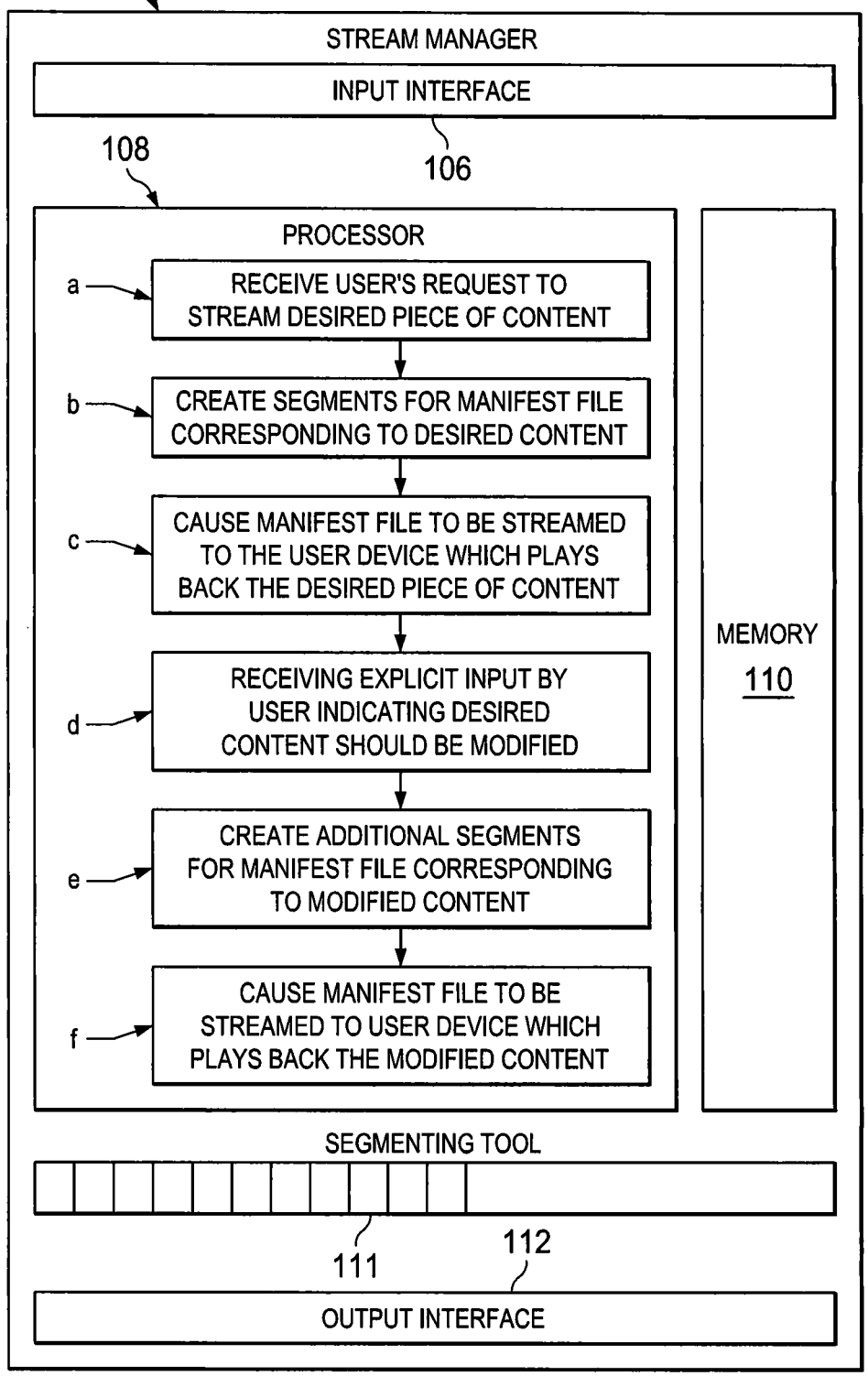

Referring to FIGS. 3A-3B, there are two diagrams used to explain another way how the stream manager 100 can create the adaptive stream manifest file 102 associated with original content 118*a* which is subsequently modified while being streamed to the user device 104 based on explicit input 114" from a user 116 of the user device 104 in accordance with another embodiment of the present invention. In FIG. 3A, there is a diagram illustrating the exemplary signaling that can take place between the stream manager 100, the user device 104, a content provider 202, and a manifest server 204 such that the stream manager 100 can create and modify the adaptive stream manifest file 102 based on explicit input 114" from the user 116. The exemplary signaling that can take place between components 100, 104, 202 and 204 are as follows:

1. The user device 104 signals the manifest server 204 that a piece of content 118*a* is desired. For example, the piece of content 118*a* can be a free promotion (trailer) of a popular new movie. The popular new movie is also available for purchase.

2. The manifest server 204 asks the stream manager 100 where to get content 118*a*.

3. The stream manager 100 contacts the content provider 202 and requests the content 118*a*.

4. The stream manager 100 receives the content 118*a* from the content provider 202.

5. The stream manager 100 uses the segmenting tool 111 to create segments for an adaptive stream manifest file 102 that corresponds to the new movie's trailer.

6. The stream manager 100 begins sending references to the segments to the manifest server 204 to be written to the adaptive stream manifest file 102.

7. The manifest server 204 returns the adaptive stream manifest file 102 to the user device 104 to enable playback of original content 118*a*.

8. The user 116 views the original content 118*a* referencing the single adaptive stream manifest file 102.

9. The user 116 while viewing the original content 118*a* is entertained and decides to purchase the movie. The user's act of purchasing the movie is explicit input 114*a*" which is received by the stream manager 100.

10. The stream manager 100 begins to write segments of the associated actual movie stream 118*b* (modified content 118*b*) for the same adaptive stream manifest file 102 that is currently being streamed to the user device 104.

11. The stream manager 100 begins sending references to the new segments to the manifest server 204 to be written to the adaptive stream manifest file 102.

12. The manifest server 204 returns the adaptive stream manifest file 102 to the user device 104 to enable playback of the actual movie 118*b* (modified content 118*b*) requiring no refreshing of the page/screen or other disruptive behaviors.

13. The user 116 seamlessly transitions to watching the actual movie 118*b* (modified content 118*b*).

14. Midway through streaming the adaptive stream manifest file 102, the user 116 is notified (perhaps through an icon in the video content, or something in the application that is displaying the video) that there is an alternate scene associated with the scene they are currently viewing on the user device 104.

15. The user 116 chooses (e.g., pushed a specific button on the user device 104) to watch the alternate scene in the movie and this explicit input 114b" is sent to the stream manager 100.

16. The stream manager 100 begins to write segments of the alternate scene 118b' (modified content 118b') for the same adaptive stream manifest file 102 that is currently being streamed to the user device 104.

17. The stream manager 100 begins sending references to the new segments to the manifest server 204 to be written to the adaptive stream manifest file 102.

18. The manifest server 204 returns the adaptive stream manifest file 102 to the user device 104 to enable playback of the alternate scene 118b' (modified content 118b') of the actual movie requiring no refreshing of the page/screen or other disruptive behaviors.

19. The user 116 seamlessly transitions to watching the alternate scene 118b' (modified content 118b') of the actual movie. After the user 116 watches the alternate scene 118' the stream manager 100 goes back to writing main stream segments at the end of the alternate scene 118b'.

The aforementioned example where the stream manager 100 causes original content 118a associated with a movie trailer located therein to be streamed to the user 116 and then pursuant to the user's explicit input 114a" the stream manager 100 adapts the adaptive stream manifest file 102 to contain references to segments associated with the actual movie (modified content 118b) and then at a later time pursuant to the user's explicit input 114b" the stream manger 100 further adapts the adaptive stream manifest file 102 again to contain references to segments associated with the alternate scene 118b' (modified content 118b') of the actual movie is just one exemplary scenario of the present invention. The skilled person having the foregoing teaching will readily appreciate that the stream manager 100 can create the adaptive stream manifest file 102 which is subsequently adapted while the user device 104 is playing back the content 118a and 118b based on many different types of explicit input 114' from the user 116 such as, for example, changing the channel, zooming in, or explicitly altering the resolution of the viewed content. Basically, the user 116 directly chooses how they want the manifest file 102 to be updated through some form of client based interactive messages 114" sent back to the stream manager 100. In any case, a more general discussion is provided next with respect to FIG. 3B about how the stream manager 100 can create the adaptive stream manifest file 102 associated with original content 118a which is modified while being streamed to the user device 104 based on explicit input 114" from the user 116 of the user device 104.

As shown in FIG. 3B, the stream manager 100 is configured to create the adaptive stream manifest file 102 associated with original content 118a which is modified while being streamed to the user device 104 based on explicit input 114" from the user 116 of the user device 104 in accordance with an embodiment of the present invention. The stream manager 100 includes the input interface 106, the processor 108, the memory 110, the segmenting tool 111 and the output interface 112. The stream manager 100 functions by having the processor 108 interface with the memory 110 and execute processor-executable instructions stored therein to enable the creating of the adaptive stream manifest file 102 by: (a) receiving a request initiated by the user 116 via the user device 104 to stream a desired piece of content 118a (step a); (b) creating segments for the adaptive stream manifest file 102 corresponding to the desired piece of content 118a (step b); (c) causing the adaptive stream manifest file 102 with references to the segments to be streamed to the user device 104 which is configured to request, receive and playback the desired piece of content 118a (step c); (d) receiving explicit input 114" initiated by the user 116 of the user device 104 indicating that the desired piece of content 118a should be modified (step d); (e) creating additional segments for the adaptive stream manifest file 102 corresponding to the modified piece of content 118b (step e); and (f) causing the adaptive stream manifest file 102 with references to the additional segments to be streamed to the user device 104 which is configured to request, receive and playback the modified piece of content 118b.

Figure 4A:
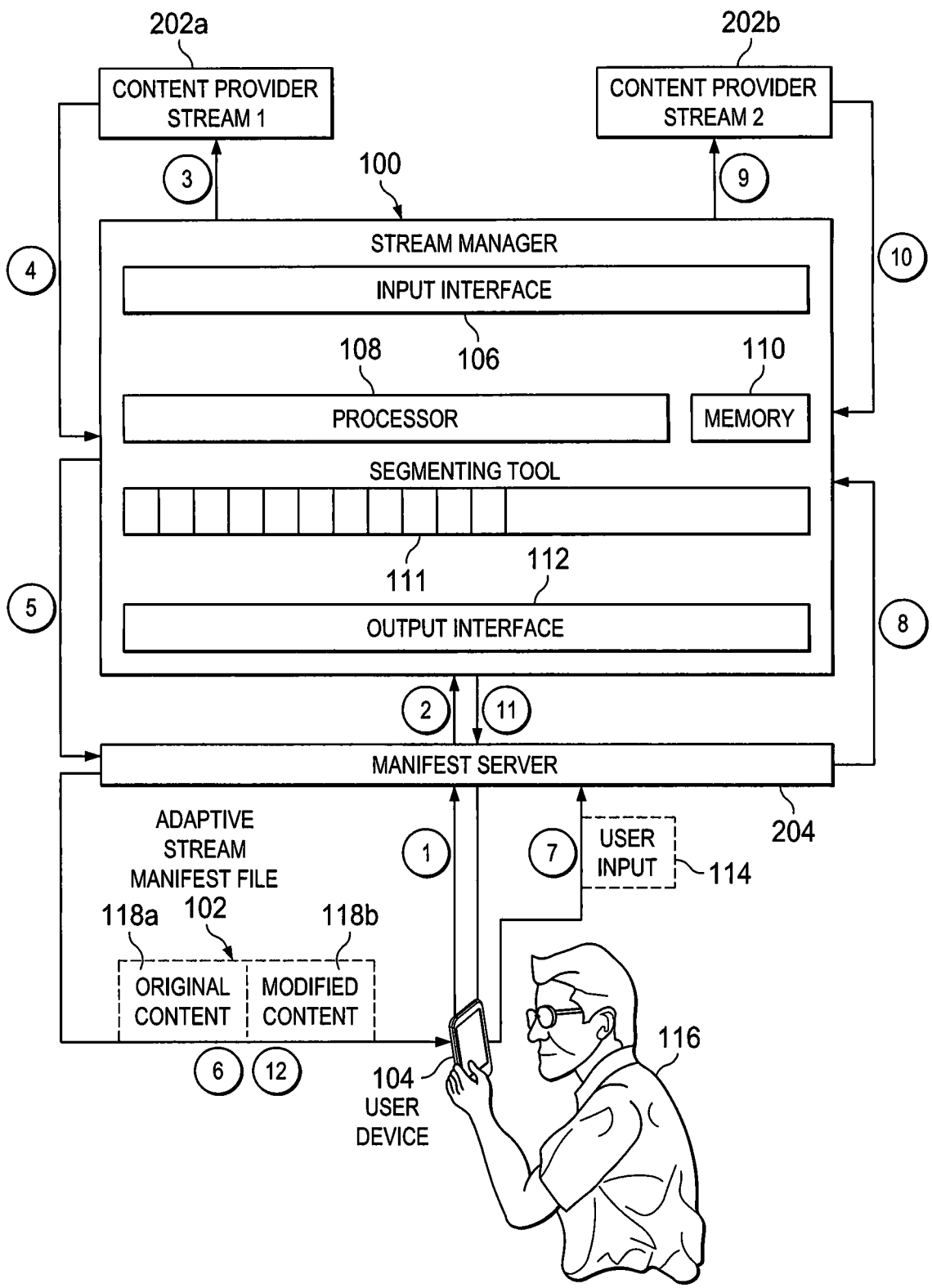
FIGS. 4A-4B are two diagrams used to explain yet another way how the stream manager shown in FIG. 1 can create an adaptive stream manifest file associated with original content which is subsequently modified while being streamed to the user device based on input from a user of the user device which playbacks the original content and modified content in accordance with an embodiment of the present invention.
Figure 4B:
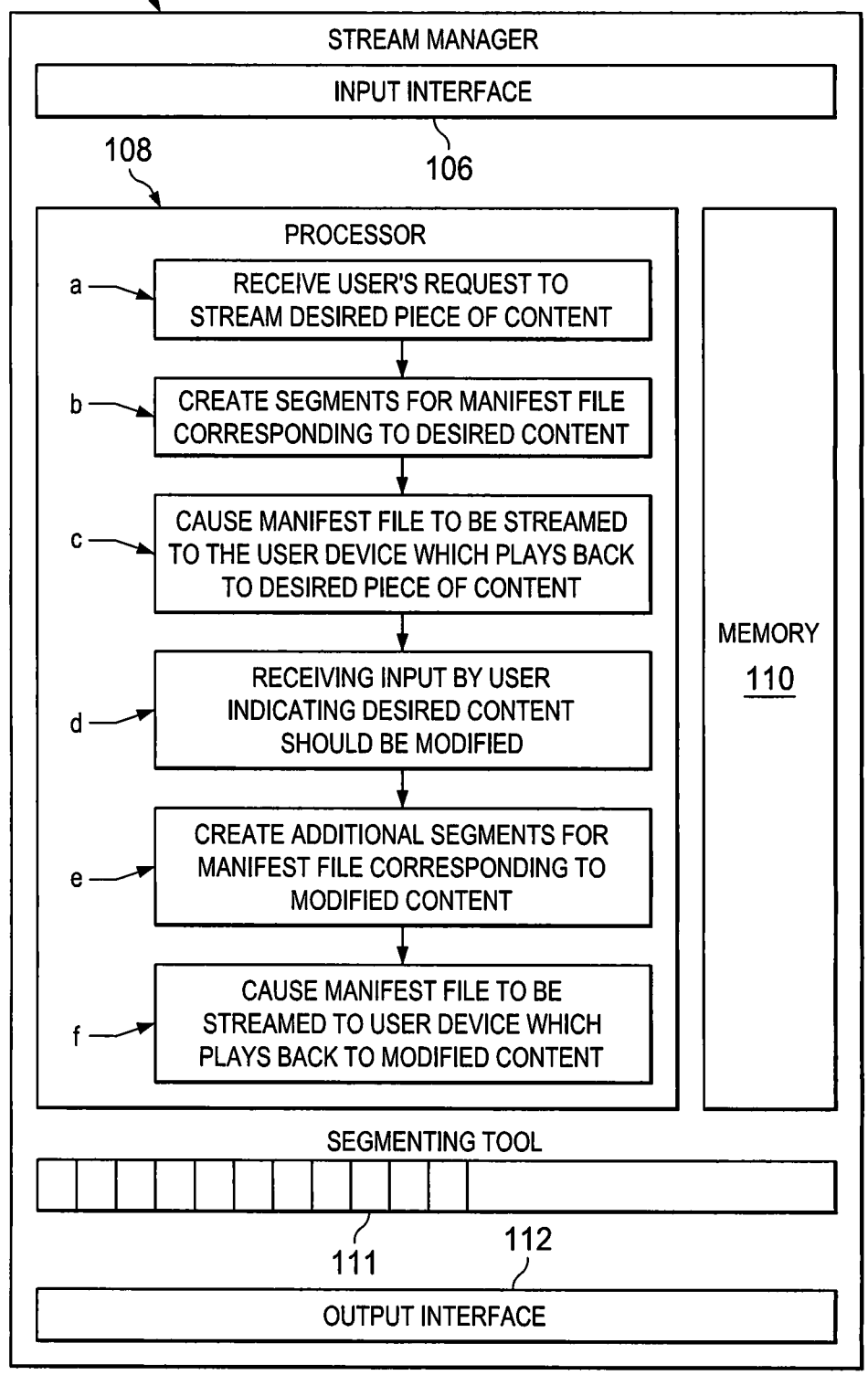

Referring to FIGS. 4A-4B, there are two diagrams used to explain yet another way how the stream manager 100 can create the adaptive stream manifest file 102 associated with original content 118a which is subsequently modified while being streamed to the user device 104 based on input 114 from a user 116 of the user device 104 in accordance with an embodiment of the present invention. In FIG. 4A, there is a diagram illustrating the exemplary signaling that can take place between the stream manager 100, the user device 104, a first content provider 202a, a second content provider 202b, and a manifest server 204 such that the stream manager 100 can create the adaptive stream manifest file 102 based on input 114 from the user 116. The exemplary signaling that can take place between the various components 100, 104, 202a, 202b, and 204 are as follows:

1. The user device 104 signals the manifest server 204 that a piece of content 118a is desired.

2. The manifest server 204 asks the stream manager 100 where to get content 118a.

3. The stream manager 100 determines that the first content provider 202a has the desired content 118a and requests it to begin streaming the desired content 118a back to it (if it isn't already).

4, The stream manager 100 begins receiving the desired content 118a streamed from the first content provider 202a.

5. The stream manager 100 uses the segmenting tool 111 to create segments associated with the desired content 118a and begin sending references to those segments to the manifest server 204 to be written to the adaptive stream manifest file 102.

6. The manifest server 204 returns the adaptive stream manifest file 102 to the user device 104 to enable playback of original content 118a.

7. The user 116 initiates a user input 114 (an upgraded account, different content, alternate scene, etc.) which leads to a modification of the content 118a. In this case, the user input 114 may be either implied input 114' (less direct input 114') or explicit input 114'.

8. The manifest server 204 asks the stream manager where to get the modified content 118b.

9. The stream manager 100 determines that the second content provider 202b has the requested content 118b and requests it to begin streaming the requested content 118a back to it (if it isn't already).

10, The stream manager 100 begins receiving the requested content 118b streamed from the second content provider 202b.

11. The stream manager 100 creates and begins sending references to the segments associated with the requested content 118b to the manifest server 204 to be written to the adaptive stream manifest file 102.

12. The manifest server 204 returns the adaptive stream manifest file 102 to the user device 104 to enable playback of the requested content 118b. Once this step is done, then no further steps are needed. For instance, the user device 104 does not need to be notified, or alter its behavior in anyway, once the manifest file 102 is changed, then the content 118b being viewed is changed.

The aforementioned example where the stream manager 100 causes originally requested content 118a from the first content provider 202a to be streamed to the user 116/user device 104 and then pursuant to the user's input 114 the stream manager 100 adapts the adaptive stream manifest file 102 to contain references to segments corresponding to the subsequently requested content 118b from the second content provider 202b to be streamed to the user 116/user device 104 is just one exemplary scenario of the present invention. The skilled person having the foregoing teaching will readily appreciate that the stream manager 100 can create the adaptive stream manifest file 102 which is subsequently adapted while the user device 104 is playing back content 118a and 118b based on one or more inputs 114 (e.g., implied input(s) 114', explicit input(s) 114", combinations of implied input(s) 114' and explicit input(s) 114"). In any case, a general discussion is provided next with respect to FIG. 4B about how the stream manager 100 can create the adaptive stream manifest file 102 associated with original content 118a which is modified while being streamed to the user device 104 based on input 114 from the user 116 of the user device 104.

As shown in FIG. 4B, the stream manager 100 is configured to create the adaptive stream manifest file 102 associated with original content 118a which is subsequently modified while being streamed to the user device 104 based on input 114 from the user 116 of the user device 104 in accordance with an embodiment of the present invention. The stream manager 100 includes the input interface 106, the processor 108, the memory 110, the segmenting tool 111 and the output interface 112. The stream manager 100 functions by having the processor 108 interface with the memory 110 and execute processor-executable instructions stored therein to enable the creating of the adaptive stream manifest file 102 by: (a) receiving a request initiated by the user 116 via the user device 104 to stream a desired piece of content 118a (step a); (b) creating segments for the adaptive stream manifest file 102 corresponding to the desired piece of content 118a (step b); (c) causing the adaptive stream manifest file 102 with references to the segments to be streamed to the user device 104 which is configured to request, receive and playback the desired piece of content 118a (step c); (d) receiving input 114 initiated by the user 116 of the user device 104 indicating that the desired piece of content 118a should be modified (step d); (e) creating additional segments for the adaptive stream manifest file 102 corresponding to the modified piece of content 118b (step e); and (f) causing the adaptive stream manifest file 102 with references to the additional segments to be streamed to the user device 104 which is configured to request, receive and playback the modified piece of content 118b.

Figure 5B:
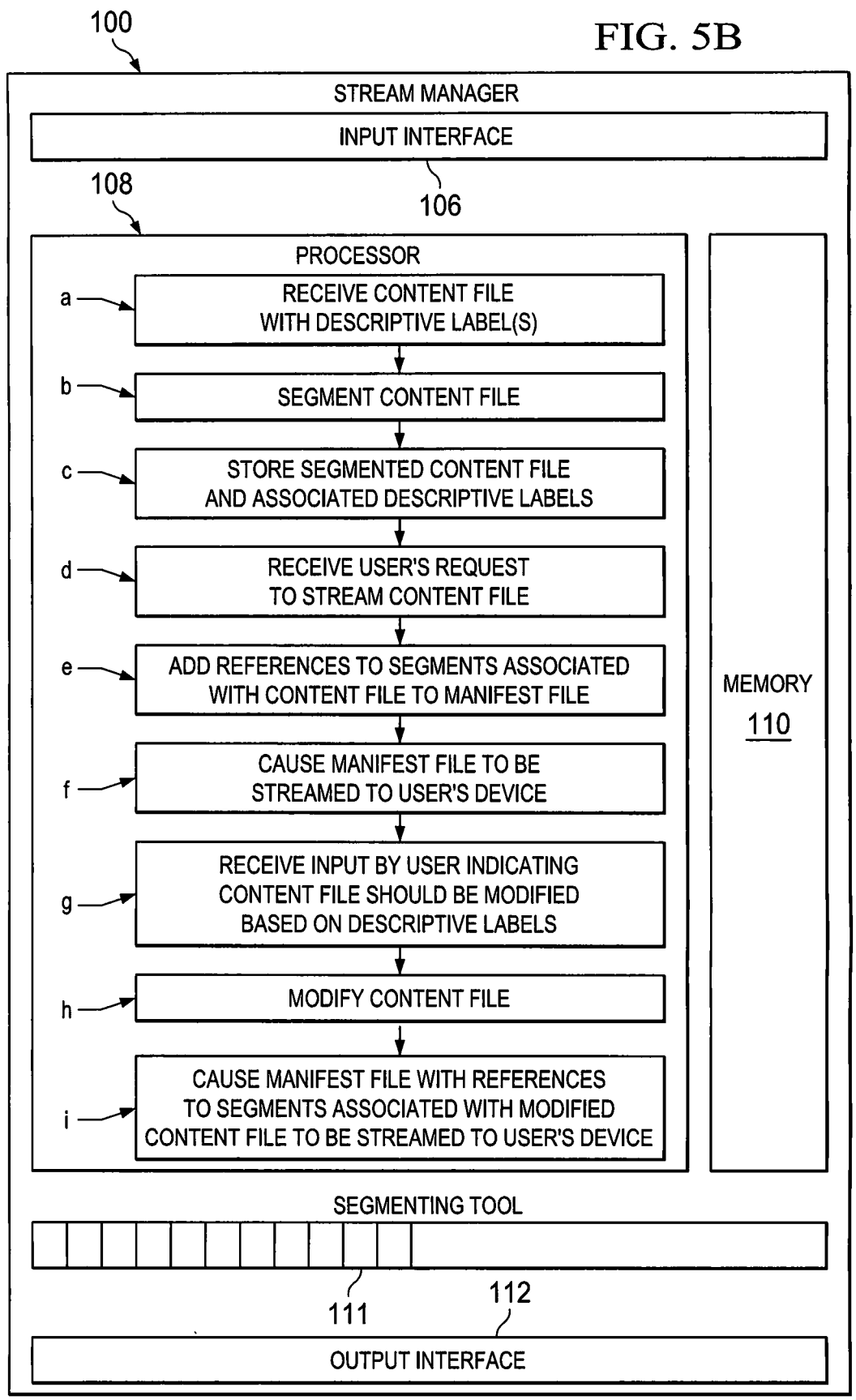

Referring to FIGS. 5A1, 5A2, and 5B, there are several diagrams used to explain still yet another way how the stream manager 100 can create the adaptive stream manifest file 102 associated with original content 118a which is subsequently modified while being streamed to the user device 104 based on input 114 from a user 116 of the user device 104 in accordance with an embodiment of the present invention. In FIGS. 5A1 and 5A2, there is a diagram illustrating the exemplary signaling that can take place between the stream manager 100, the user device 104, a content provider 202, and a manifest server 204 such that the stream manager 100 can create and modify the adaptive stream manifest file 102 based on input 114 from the user 116. The exemplary signaling that can take place between components 100, 104, 202 and 204 are as follows:

1. The stream manager 100 receives a content file 502a from the content provider 202. The content file 502a has one or more scenes 504 each of which associated with one or more descriptive labels 506. In one example, the content provider 202 may create the content file 502a by using a video encoder 508 to encode a video (usually in MPEG format). Alternatively, the content provider 202 may capture the content file 502a by using a capture tool 510. Then, the content provider 202 may use an editor mark-up tool 512 that allows an editor to "mark-up" the video to add one or more descriptive labels 506 or tag the different scenes 504 of the video (MPEG). For example, the editor can add any type of descriptive labels 506 including one or more of the following: (a) indicate importance of the corresponding scene 504 in regard to a plot of a show in the content file 502a; (b) indicate a particular subject of the corresponding scene 504 in regard to different parts of a news program in the content file 502a; (c) indicate a particular character associated with the corresponding scene 504 in regard to a show in the content file 502a; or (d) indicate a particular keyword associated with the corresponding scene 504 in the content file 502a.

2. The stream manager 100 includes a segmenting tool 111 which uses standard segmentation techniques to segment the content file 502a. In addition, the stream manager 100 when forming the segments 514 of the content file 502a reads, takes into account, and stores the embedded descriptive labels 506 (e.g., actors, plot importance, rating) associated with the content file 502a.

3. The stream manager 100 stores each segment 514 and associated one or more descriptive labels 506 which correspond to the content file 502a.

4. The user device 104 signals the manifest server 204 that the content file 502a is desired.

5. The manifest server 204 asks the stream manager 100 to begin streaming the content file 502a.

6. The stream manager 100 sends references to segments associated with the desired content file 502a to the manifest server 204 to be written to the adaptive stream manifest file 102.

7. The manifest server 204 returns the adaptive stream manifest file 102 to the user device 104 to enable playback of the content file 502a (including the descriptive labels 506).

8. The user 116 initiates a user input 114 indicating that the content file 502a should be modified based on at least one of the one or more descriptive labels 506. For instance, the user 116 may submit user input 114 indicating that they only want to watch the sports from the news broadcast in the content file 502a. Or, the user 116 may submit user input 114 indicating that they want to watch goals or scores from a sporting event in the content file 502a. The user input 114 which reflects how the user 116 wants to modify the content file 502a is received by the stream manager 100.

9. The stream manager 100 receives the user input 114 and creates a modified content file 502b which includes only the segments 514' that matches the input 114 from the user 116. For instance, the stream manager 100 filters the content file 502a according to the user input 114 (e.g., only wants to watch the sports from news broadcast) and the associated one or more descriptive labels 506 to create segments 514' associated with the modified content file 502b (e.g., sports from news broadcast) that match the input 114 from the user 116.

10. The stream manager 100 begins sending references associated with the identified segments 514' to the manifest server 204 to be written to the adaptive stream manifest file 102.

11. The manifest server 204 returns the adaptive stream manifest file 102 to the user device 104 to enable playback of the modified content 502b. Once this step is done, then no further steps are needed. For instance, the user device 104 does not need to be notified, or alter it's behavior in anyway, once the manifest file 102 is changed, then the content 118b being viewed is changed.

As shown in FIG. 5B, there is a block diagram of the stream manager 100 configured to create the adaptive stream manifest file 102 associated with original content 502a which is subsequently modified while being streamed to the user device 104 based on input 114 (taking into account one or more descriptive labels 506) from the user 116 of the user device 104 in accordance with an embodiment of the present invention. The stream manager 100 includes the input interface 106, the processor 108, the memory 110, the segmenting tool 111 and the output interface 112. The stream manager 100 functions by having the processor 108 interface with the memory 110 and execute processor-executable instructions stored therein to enable the creating of the adaptive stream manifest file 102 by: (a) receiving the content file 502a with one or more descriptive labels 506 associated with one or more scenes 504 of the content file 502a (step a); (b) segmenting the content file 502a while taking into account the one or more descriptive labels 506 associated with the one or more scenes 504 of the content file 502a (step b); (c) storing each segment 514 and associated one or more descriptive labels 506 of the content file 502a (step c); (d) receiving a request initiated by the user 116 via the user device 104 to stream the content file 502a (step d); (e) adding references associated with segments 514 to the content file 502a to the adaptive stream manifest file 102 (step e); (f) causing the adaptive stream manifest file 102 containing the references to the segments 514 associated with the content file 502a to be streamed to the user device 104 which is configured to request, receive and playback the content file 502a (step f); (g) receiving an input 114 initiated by the user 116 of the user device 104 indicating that the content file 502a should be modified based on at least one of the one or more descriptive labels 506 (step g); (h) modifying the content file 502a to include only the segments 514' per the input 114 from the user 116 (step h); and (i) causing the adaptive stream manifest file 102 with references to the segments 514' associated with the modified content file 502b to be streamed to the user device 104 which is configured to request, receive and playback the modified content file 502b (step i).

In this embodiment, the stream manager 100 effectively pairs adaptive streaming segments 514 with metadata assigning each scene 504 with zero or more meaningful descriptive labels 506. The descriptive labels 506 are later used to filter the content file 502a according to certain criteria either directly given by the user (e.g., a search for similar scenes) or automatically generated by user preferences. For example, a "content shifted scene" might be created of segments 514' which have been marked to indicate the importance of a scene in regards to the plot of the show, a particular subject such as the local news, or a particular character within a television show such as "Luke and Laura" or with keywords such as "explosion" or "goal". In effect, the stream manager 100 allows the user 116 to "content shift" their programming perhaps by fitting a half hour news cast into 5 minutes, viewing extended content seamlessly at the end of a program, or following a particular character within a television show.

Another advantage of this embodiment is that it enables a user 116 who has a limited time to view content or does not care about other characters story lines within a show to "content shift" the show using adaptive streaming technology combined with the aforementioned features to shorten or lengthen a program's run time to fit their schedule. For instance, the scenes 504 which are important to a plot may be marked and scenes 504 which are less important may be labeled as well. Then, the user 116 could for instance watch a day time soap opera in 5 minutes by just viewing highlights (scenes 504 marked as important to the plot).

From the foregoing, the skilled person having the foregoing teaching will readily appreciate that a system has been disclosed wherein adaptive streaming manifest files 102 (in HLS or other formats using segmenting) are created on the fly based on user input 114. Thus, the same technology that allows adaptive manifest files to be altered based on passive attributes like user's bandwidth can be utilized to do more robust adaptations based on active attributes, such as implied user input 114', or explicit user input 114" (interactive adaptive streaming), or a combination of both. The stream manager 100 can modify streams in a variety of ways. For example, a user 116 could see one stream if logged in (without ads, or with limited ads, for example), and another stream would be written to the manifest file 102 if the user 116 is logged out (with ads, etc). In addition, the user 116 could explicitly request changes in their stream based on their needs (they could change what they are watching mid program (content shifting)(alternate scene, or even a different program), and only the segments written to the manifest file 102 would be altered so the user 116 would not have to use their video player to select a different file to stream the desired content.

Furthermore, the stream manager 100 also provides a variety of new features or innovations, such as time compression and expansion, automatic montages and much more. For example, an individual manifest file 102 can be labeled or "tagged" with content descriptors 506, and the associated content 502a can be stitched together based on such labels 506. In one case, a program with "extended scenes" can be expanded for segment A to be followed by A1, A2 before finally resuming at B, for example, and thus be expanded in a natural way. Alternatively, scenes can be compressed, with the user 116 (for example) specifying they only want to see local news while watching a news program, and thus can watch segments A_local B_local and D_local, completely skipping scene C_global. Finally, segments can be stitched together from one or more video sources, creating a "montage" which would allow both consumers to entertain themselves, and advertisements or trailers for popular movies to be generated on the fly. For example, the user 116 could ask for segments labeled "explosions", and thus have a manifest file 102 created for them that consists of only explosions.

If desired, the stream manager 100 can also utilize existing streaming technology thereon to monitor the user's bandwidth and buffer capacity in real time and then adjust the quality of a video stream accordingly while at the same time allowing more user interactivity and a customized user experience as described above with respect to FIGS. 2-5. Hence, the stream manager 100 solves a problem of increasing the value of existing adaptive streaming technology by utilizing it in similar ways to video-on-demand technology. As such, the user 116 can enjoy all the advantages of video-on-demand technology along with a live streaming format where advertisements can be customized based on an user attribute, and the user 116 can change what they are viewing whenever they want all without the hassle of altering the file that their player/user device is currently playing.

The stream manager 100 basically allows users 116 to have a fully interactive experience, all the while using powerful adaptive streaming technology to have the best video experience their bandwidth allows. The traditional adaptive streaming technology is decidedly one way: users select content.

Users are streamed content. If users pick new content, they get a new stream for their player to receive. In contrast, the user adaptive streaming of the present invention allows streaming content to be modified on the fly, based on user input. This powerful innovation allows users to feel fully involved with their content which is desirable in an increasingly interactive world.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A stream manager comprising:
a processor; and
a memory that stores processor-executable instructions therein where the processor interfaces with the memory and executes the processor-executable instructions to enable the following:
receive a request initiated by a user of a user device to stream a desired piece of content;
create segments for an adaptive stream manifest file corresponding to the desired piece of content;
cause the adaptive stream manifest file with references to the segments to be streamed to the user device which is configured to request, receive and playback the desired piece of content;
receive an input initiated by the user of the user device indicating that the desired piece of content should be modified;
create additional segments for the adaptive stream manifest file corresponding to the modified piece of content; and
cause the adaptive stream manifest file with references to the additional segments to be streamed to the user device which is configured to request, receive and playback the modified piece of content.

2. The stream manager of claim 1, wherein the input from the user is an implied input.

3. The stream manager of claim 2, wherein the implied input includes one or more of the following an updated account status, demographics, and prior viewing habits.

4. The stream manager of claim 1, wherein the input from the user is an explicit input.

5. The stream manager of claim 4, wherein the explicit input includes one or more of the following a request to change a channel, a request to view an alternate scene, a request to zoom-in, and a request to alter a resolution of the content.

6. The stream manager of claim 1, wherein:
the desired piece of content has advertising therein; and
the modified piece of content does not have advertising therein.

7. The stream manager of claim 1, wherein:
the desired piece of content is a trailer for a movie; and
the modified piece of content is the movie.

8. The stream manager of claim 1, wherein:
the desired piece of content is provided by a first content provider; and
the modified piece of content is provided by a second content provider.

9. A method implemented by a stream manager for creating an adaptive stream manifest file which is streamed to a user device, the method comprising:
receiving a request initiated by a user of the user device to stream a desired piece of content;
creating segments for the adaptive stream manifest file corresponding to the desired piece of content;
causing the adaptive stream manifest file with references to the segments to be streamed to the user device which is configured to request, receive and playback the desired piece of content;
receiving an input initiated by the user of the user device indicating that the desired piece of content should be modified;
creating additional segments for the adaptive stream manifest file corresponding to the modified piece of content; and
causing the adaptive stream manifest file with references to the additional segments to be streamed to the user device which is configured to request, receive and playback the modified piece of content.

10. The method of claim 9, wherein the input from the user is an implied input.

11. The method of claim 10, wherein the implied input includes one or more of the following an updated account status, demographics, and prior viewing habits.

12. The method of claim 9, wherein the input from the user is an explicit input.

13. The method of claim 12, wherein the explicit input includes one or more of the following a request to change a channel, a request to view an alternate scene, a request to zoom-in, and a request to alter a resolution of the content.

14. The method of claim 9, wherein:
the desired piece of content has advertising therein; and
the modified piece of content does not have advertising therein.

15. The method of claim 9, wherein:
the desired piece of content is a trailer for a movie; and
the modified piece of content is the movie.

16. The method of claim 9, wherein:
the desired piece of content is provided by a first content provider; and
the modified piece of content is provided by a second content provider.

17. A method implemented by a stream manager for creating an adaptive stream manifest file which is streamed to a user device, the method comprising:
receiving a content file with one or more descriptive labels associated with one or more scenes of the content file;
segmenting the content file while taking into account the one or more descriptive labels associated with the one or more scenes of the content file;
storing each segment and associated one or more descriptive labels of the content file;
receiving a request initiated by a user of the user device to stream the content file;
adding references associated with the segments to the adaptive stream manifest file;
causing the adaptive stream manifest file containing the references to the segments associated with the content file to be streamed to the user device which is configured to request, receive and playback the content file;
receiving an input initiated by the user of the user device indicating that the content file should be modified based on at least one of the one or more descriptive labels;
modifying the content file to include only the segments per the input from the user; and
causing the adaptive stream manifest file with references to the segments associated with the modified content file to be streamed to the user device which is configured to request, receive and playback the modified content file.

18. The method of claim 17, wherein the one or more descriptive labels associated with the one or more scenes of the content file:
- indicate importance of the corresponding scene in regard to a plot of a show in the content file;
- indicate a particular subject of the corresponding scene in regard to different parts of a news program in the content file;
- indicate a particular character associated with the corresponding scene in regard to a show in the content file; or
- indicate a particular keyword associated with the corresponding scene in regard to a show in the content file.

19. A stream manager comprising:
- a processor; and
- a memory that stores processor-executable instructions therein where the processor interfaces with the memory and executes the processor-executable instructions to enable the following:
  - receive a content file with one or more descriptive labels associated with one or more scenes of the content file;
  - segment the content file while taking into account the one or more descriptive labels associated with the one or more scenes of the content file;
  - store each segment and associated one or more descriptive labels of the content file;
  - receive a request initiated by a user of a user device to stream the content file;
  - add references associated with the segments to an adaptive stream manifest file;
  - cause the adaptive stream manifest file containing references to the segments associated with the content file to be streamed to the user device which is configured to receive and playback the content file;
  - receive an input initiated by the user of the user device indicating that the content file should be modified based on at least one of the one or more descriptive labels;
  - modify the content file to include only the segments per the input from the user; and
  - cause the adaptive stream manifest file with references to the segments associated with the modified content file to be streamed to the user device which is configured to request, receive and playback the modified content file.

20. The stream manager of claim 19, wherein the one or more descriptive labels associated with the one or more scenes of the content file:
- indicate importance of the corresponding scene in regard to a plot of a show in the content file;
- indicate a particular subject of the corresponding scene in regard to different parts of a news program in the content file;
- indicate a particular character associated with the corresponding scene in regard to a show in the content file; or
- indicate a particular keyword associated with the corresponding scene in regard to a show in the content file.

* * * * *